Dec. 29, 1931.　　　　　M. EULE　　　　1,839,091
MECHANICAL RELAY FOR TRANSMITTING ADJUSTING IMPULSES
Filed Dec. 20, 1927　　2 Sheets-Sheet 1
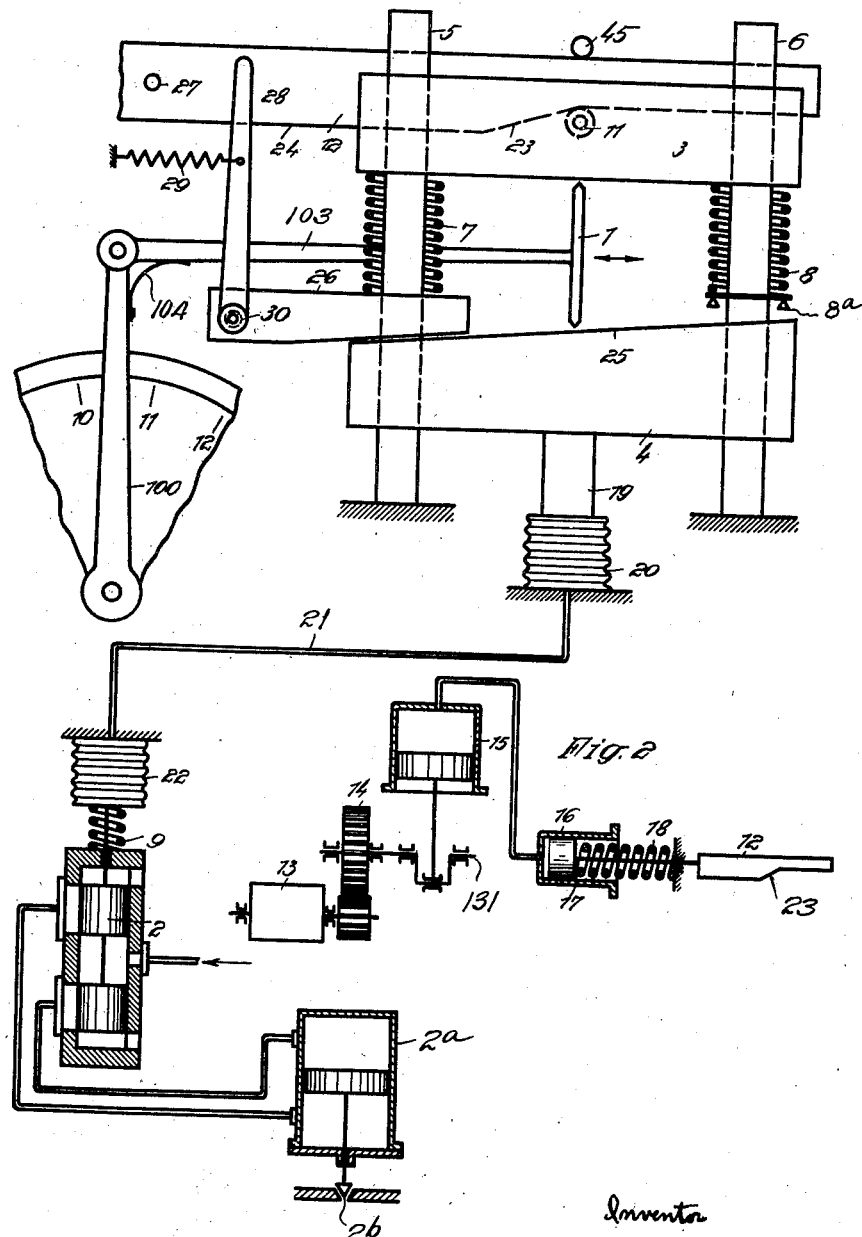

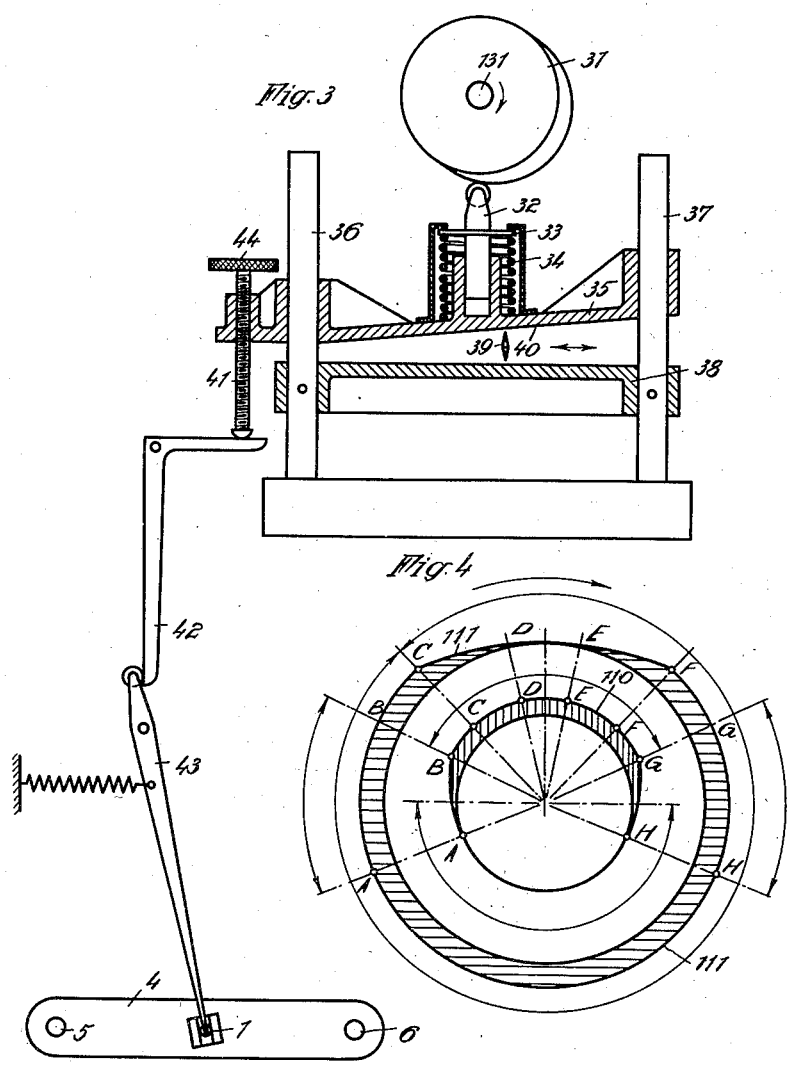

Patented Dec. 29, 1931

1,839,091

UNITED STATES PATENT OFFICE

MARTIN EULE, OF BERLIN-SPANDAU, GERMANY, ASSIGNOR TO SIEMENS-SCHUCKERT-WERKE AKTIENGESELLSCHAFT, OF BERLIN-SIEMENSSTADT, GERMANY, A CORPORATION OF GERMANY

MECHANICAL RELAY FOR TRANSMITTING ADJUSTING IMPULSES

Application filed December 20, 1927, Serial No. 241,444, and in Germany December 24, 1926.

My invention relates to mechanical relays for transmitting adjusting impulses.

The known regulation or control gears with control member, auxiliary control mechanism and adjusting gear can be applied only when sufficiently great adjusting forces are available, since even in a well built device the resistance to be overcome in transmitting the impulse is quite considerable. The application of otherwise well known regulation gear is thus impossible in all cases where the releasing forces are only small, for instance when the releasing impulses emanate from thermo-couples, gage springs and the like. Particularly unfavorable in this respect is the fact that at the beginning of a regulation or control process it is first necessary to overcome the stationary friction, which is considerably greater than the friction of motion, as is well known.

In order to permit the transmission of regulating impulses emanating from small forces and to eliminate the stationary friction the ordinary control system comprising a control member, an auxiliary control mechanism and an adjusting gear is according to my invention designed in such a maner that the mechanical amplifier, which is almost indispensable in such devices for the transmission of impulse movements to the auxiliary control mechanism, contains a member with a large reserve of power continuously kept in motion by an independent driving device, the travel of which is varied by the impulse responsive member in accordance with the variations of the control, and the motion of which is transmitted to the auxiliary control mechanism, if desired through further transmission means.

My improved device is particularly suitable for the automatic regulation of boilers, thermo-couples, carbonic acid meters, pressure gages or other measuring devices being employed as impulse emitting members, which supervise the generation or consumption of steam in one part of the power plant. In other words I employ elements or devices of any kind suitable for the particular purpose on hand, which are responsive to the variation of a variable condition, such as temperature, electrical or mechanical pressure or flow intensity and other conditions of anything which it may be desirable to supervise and utilize. In my improved device the force actuating the regulation process is independent of the force initiating the regulation process. The latter may thus be extraordinarily small while the former may be chosen as high as desired, so that the stationary friction and the resistances to the motion remain without effort upon the regulation process.

In the drawings affixed hereto and forming part of my specification an embodiment of my invention is illustrated by way of example.

In these drawings:

Fig. 1 represents a diagrammatic representation of the regulation or control gear, Fig. 2 represents the drive of a part of the gear in Fig. 1 in diagrammatic representation, Fig. 3 represents an intermediate control gear, and Fig. 4 represents a diagram showing the motions of the intermediate and main regulation or control gear in relation to each other.

The regulation or control gear of the adjusting mechanism may either be used by itself or in conjunction with an intermediate control gear. The employment of the intermediate control gear is necessary if the original impulse responsive member develops such small forces of motion, that it is not capable of carrying the impulse transmitting element, for instance in the case of thermo-couples. The difference is that in the first case the original impulse transmitting element is compelled to transmit the total force required to actuate the control element of the final relay, while in the second case, when an intermediate control gear is employed, the original impulse responsive element (39 in Fig. 3) need at most sustain only that force which is necessary to operate the pilot device (39 Fig. 2) of the intermediate control gear which in turn pilots (by means of 1, Fig. 1) the main control device. Consequently, this intermediate pilot device may be very light and requires for its movement to adjust it, a force representing a few grams only, and consequently can be actuated by a very delicate original impulse responsive member.

In Fig. 1 the pilot device 1 of the final control gear or relay is actuated without the aid of an intermediate control gear. The original impulse responsive element is here represented by the pointer 100 of a pressure gage. Its movements according to varying boiler pressure are transmitted and made effective for regulating purposes in the following manner.

The object in the present example is to actuate, according to the variations of pointer 100, the pilot piston 2 of a servo-motor $2^a$ for any desired purpose, for instance as shown for operating a control valve $2^b$ of the system to be controlled, or the adjusting mechanism of an electric resistor or any other regulating device, with which the present invention is not particularly concerned. Likewise, the servo-motor $2^a$, and its pilot element 2 may be of any suitable construction, the only object here being to operate that pilot element to control the functions of the servo-motor $2^a$.

For transmitting the motion of the original control impulse represented by the movements of pointer 100, there are provided two transversely movable cross bars 3 and 4 guided upon posts or uprights 5 and 6 transversely to the bars.

The upper bar 3 is supported on the right hand end by a spring 8 resting at its lower end on a fixed support $8^a$, and on the left hand end by a spring 7 resting at its lower end upon an adjustable clamp 26 movable on post 5. This clamp can be tightened against upright 5 in any well known manner not illustrated in detail, for instance by means of a cam device indicated at 30, by moving to the left a lever arm 28, operating this cam device. This arm is normally drawn by a spring 29 to the left thereby tightening the clamp 26 on post 5 wherever it may be located vertically on the post. On the cross bar 3 is mounted a roller 11 over which moves a sliding bar 12 which is guided on its upper edge by a stationary roller 45, disposed opposite roller 11, which moves with bar 3. The operating mechanism for this bar is diagrammatically illustrated in Fig. 2 of the drawings.

Referring to this figure it will be seen that a motor 13 drives through a reduction gear 14 a pump 15 the cylinder of which is in communication with a power cylinder 16. The piston 17 moving in this cylinder 16 and connected with the slide bar 12 is moved towards the left during the suction stroke of the pump 15 and towards the right during the compression stroke of the pump. A spring 18 assists in the reversal of the piston 17 when the piston 15 is on the suction stroke. Slide 12 is provided with a cam 23, which when it encounters roller 11 on its way to the right, depresses this roller, and thus bar 3 against springs 7 and 8 at each stroke of the slide to the right. Arm 28 of clamp 26, previously mentioned extends past slide 12 and is engaged by a stud 27 on slide 12, and swung thereby at each stroke of the slide 12 to the right, thereby unlocking clamp 26 from post 5, so that the clamp can move down under the pressure of spring 7, whenever bar 3 at each slide stroke has arrived near its lowermost point.

With the cross bar 4 is connected through a piston rod 19 a cylindrical collapsible diaphragm 20, and with this diaphragm through a pipe 21 a cylindrical collapsible diaphragm 22 with which is connected the pilot piston 2 for servo-motor $2^a$ aforementioned. The cylindrical diaphragms 20 and 22 and the pipe 21 are filled with a liquid, such as oil. They represent a hydraulic transmission system. A spring 9 is provided between the casing of pilot piston 2 and the diaphragm 22 tending to compress the latter and thereby exerting hydraulically an upward pressure against bar 4 which always maintains the latter in contact with clamp 26, and which when the clamp is loose on post 5 exerts a counter pressure against spring 7. The upper side of bar 4 is inclined with respect to the lower side of bar 3, and between these two bars is located a spacing pin 1 fixed on arm 103 pivotally connected with the indicator arm 100, so that when the indicator moves, pin 1 is shifted in the directions of the double arrow. Arm 103 is yieldingly supported in substantially horizontal position by spring 104.

The device functions in the following manner: The adjusting or control impulse represented by the movement of indicator 100 moves the pin 1 from the position it had occupied at the time in one or the other direction as soon as on the left hand stroke of slide 12 the bars 3 and 4 have moved apart far enough to permit the pin to do so. Whatever the newly assumed position of pin 1 may be, during the next downward motion of the bar 3 the pin 1 is moved vertically downwards, comes in contact with the cross bar 4 and forces this bar 4 downwards until the lower edge 24 of slide 12 has run on to the roller 11. The downward motion of the cross bars 3 and 4 then stops. The cross bar 4 and the piston of the relay 2 have then attained the control position corresponding with the impulse transmitted. The stroke of the cross bar 4 thus changes according to the point at which the pin 1 engages the inclined upper edge 25 of bar 4. According to the stroke of the cross bar 4 the cylindrical diaphragm 20 is compressed more or less, and more or less oil is forced into the cylindrical diaphragm 22 and the pilot piston 2 moved up or down by the corresponding amount.

The object of the clamping device 26, previously described, is to arrest the cross bar 4 and simultaneously the piston 2 of the servo-motor relay in the lowermost position determined by the prevailing horizontal adjustment of pin 1, and by the cam 23, and to permit of cross bar 4 remaining in position when slide 12 recedes and bar 3 rises, thereby freeing pin 1 to permit indicator 100 to move it to another point, if the indicator should have that tendency. The further object of this device is to permit the upward pushing of the cross bar 4 by the spring 9 only when the pin has attained a new regulation position during the next regulation cycle which would warrant such an upward movement. This happens when the new adjustment of the pin 1 by the regulating impulse of indicator 100 is towards the left of the preceding position occupied by the pin. In this case the cross bar 4 should move upward which is accomplished by the spring 9 which through bar 4 moves clamp 26 upward as soon as it is unlocked. If the pin moves towards the right of its preceding position it carries the cross bar 4 correspondingly further down beyond the position in which it was held by clamp 26 after the previous stroke.

The adjusting device just described may be made applicable for very feeble regulating impulses by connecting a preliminary or intermediate control device in series with it.

Such an intermediate control gear for the main control gear illustrated in Fig. 1 is shown in Fig. 3. By the aid of this modification a greater sensitiveness as compared with the first described construction may be obtained insofar as now the adjustment of the pin aforementioned requires forces of a few grams only. Otherwise the principle embodied in it is the same as in the mechanism illustrated in Fig. 1. In this case I provide a member 32, 33 reciprocated with uniform strokes between two dead points, the motion of which member is transmitted to a second reciprocating member 35 capable of performing a similar motion, the ratio of the stroke of the first member to the stroke of the second member being varied by an abutment pin 39, similar to pin 1 in Fig. 1, and which is adjusted by the impulse responsive member (such as gage hand 100 in Fig. 1). Instead of the slide bar 12 provided in Fig. 1, there is provided upon a shaft 131 a cam 31 which actuates a tappet 32. The shaft 131 is uniformly rotated by any suitable auxiliary drive, not shown, but rotates in timed relation to the movements of slide 12. For the sake of clearness the element which moves pin 39 has likewise been omitted since its character is clearly shown at 100 in Fig. 1. On the tappet 32 is fixed a supporting plate 33 against which abuts a spring 34. With its other end the spring rests against a yoke 35 guided on uprights 36 and 37. The device is furthermore provided with a stationary yoke 38 along which moves the pin 39 when adjusted by the regulating impulses. The surface 40 of yoke 35, facing yoke 38, is inclined with respect to the latter, surface 40 ascending towards the right. When the cam 31 is rotated by its drive, tappet 32 is moved downward and with it the yoke 35 under the influence of spring 34, until yoke 35 abuts against pin 39. During the further rotation of the cam 31 the spring 34 is merely compressed without the yoke 35 being able to move further. The motion of the yoke 35 is transmitted by an adjustable screw spindle 41 through a bell crank and lever system 42, 43 to the spacing pin 1 of the main controlling mechanism shown in Fig. 1. 4 is in plan the cross bar 4 of Fig. 1, and 5 and 6 represent the upright posts guiding it, as previously described.

Spindle 41 is provided with a small head 44, for the purpose of adjusting the range within which pin 1 moves between bars 3 and 4. It will be noted that with such an arrangement the force for adjusting the main control pin is exerted by cam 31 across 32, 33, 34, 35, 41 and 42 to the arm 43 which carries pin 1 in this case, without passing through the pin 39. This means that the forces acting in the system are equalized in such a manner that the abutment or spacing pin 39 has to sustain a very minute force only, so that it may be made very light, as compared with spacing pin 1, which must transmit the entire force required to operate pilot piston 2.

In the diagram shown in Fig. 4 of the drawings are represented the conditions of motion of the intermediate and the main control system. A complete circle corresponds with a complete control cycle. The line 110 indicates the path of the intermediate drive, the line 111 the path of the main control drive. The diagram also represents the driving cams for the intermediate and the main control, if, which is possible, the sliding cam 23 of Fig. 1 is replaced by a circular cam such as 31 in Fig. 3. The vertically shaped portion represents the eccentric portion of the intermediate control cam 31, the horizontally shaded portion the eccentric portion of the main control cam 23. The motion of the intermediate operating yoke 35 commences at the point A and is completed at the point B. The yoke 35 maintains its depressed position to the point G. Here commences the reverse motion which is finished at H. From H to A the intermediate control pin 39 is free to be readjusted by the original impulse responsive means, such as the arm 100 in Fig. 1. During the depressing motion of the control cam 31, the main control cam 23 commences at C to release bar 3 (Fig. 1). This motion is completed at the point D. From D to E the main control pin 1 is free to move and can be brought into the position corresponding with maximum depression of yoke 35 permitted by pin 39, and thus into the intended regulating position. At the point E the main yoke 3 commences to descend and this motion is completed at F. If the position of the main pin 1 is to the right of the position assumed during the preceding regulation cycle, the bar 4 is moved further down beyond its previous control position to an extent corresponding with the original control impulse, whereas if the pin 1 should assume its new position to the left of that assumed in the previous cycle, bar 3 makes an idle stroke, because pin 1 cannot reach the lower incline of surface 25. In that case bar 4 takes the necessary upward control position under the action of spring 9 only after clamp 26 is fully released by releasing lock 30 through arm 28, which occurs during maximum depression of bar 3 which full release exists in Fig. 4 between H and A on path 111, clockwise speaking, during which portion of the cycle cam 23 maintains bar 3 completely depressed, but slide 12 moves still further to the right for the purpose of releasing lock 30. At point A the lock 30 commences to be applied again and at the same time the new stroke of the intermediate yoke 35 commences. At the point C the locking motion is finished, bar 4 is consequently arrested until after a new adjustment of the pin 1 the main bar 3 initiates at the point E a new adjustment cycle. It should be noted that during the further advance of pin 1 towards the left, owing to the motion of the pin 39 towards the right, the adjustment of the pin 1 can take place only when the main bars 3 and 4 have released the pin 1. As long as the pin 1 is clamped between the bars the intermediate control yoke 36 cannot take up the control position corresponding with the impulse. The spring 34 will therefore merely be compressed. The yoke 36 assumes the correct position under the influence of spring 34 only after the pin 1 has been released from between the main bars 3 and 4, which is at the point D of the circular diagram.

In the systems described up to now it was assumed that an auxiliary control system, such as including pilot piston 2 controlling servo-motor 2ª for operating an adjusting gear (such as valve 2ᵇ) is to be operated by the main control bar 4. If the forces to be overcome for carrying out the final adjustment are small only, the auxiliary control system may naturally be omitted and for instance bar 4 in Fig. 1 may operate valve 2ᵇ directly.

Various modifications and changes may be made without departing from the spirit and the scope of the invention.

I claim:

1. In a mechanical relay for transmitting in the form of regulating impulses to a regulating gear moving forces of an element, due to its response to the variation of a variable condition, in combination a periodically and independently operating impulse producing element performing full strokes of uniform length, an impulse transmitting element for transmitting any desired portion of the length of each of said full strokes to said gear, and means interposed between said impulse producer and transmitter and movable by said responsive element for determining the length of the portion of each full impulse stroke to be transmitted, and means for arresting said transmitting element at the end of each impulse stroke and for releasing it during the succeeding stroke of said impulse producing element to cause the transmission to said gear as an effective control impulse stroke only the difference between the adjusted stroke lengths of two succeeding strokes, produced by the movement of said interposed means through said responsive element.

2. In a mechanical relay for transmitting in the form of regulating impulses to a regulating gear moving forces of an element, due to its response to the variation of a variable condition, in combination two operating bars transversely guided at their ends and adapted to move toward and away from each other, the sides of said bars, facing each other, being inclined towards each other, means for moving one of said bars toward the other periodically in full strokes of uniform length, an impulse transmitting contrivance connecting said other bar with the gear to be regulated, and a spacing pin interposed in the inclined space between said bars for transmitting the impulse strokes of the first bar to the second bar, said pin being movable by said responsive element over the length of said space for determining the length of the portion of each full stroke to be transmitted to said second bar, and means for arresting said second bar at the end of each impulse stroke transmitted to it by said pin, and for releasing it during the succeeding impulse stroke of said first bar, to cause the transmission to said gear as an effective impulse stroke only the difference between the adjusted stroke lengths of two succeeding strokes produced by the movement of said pin through said responsive element.

3. In a mechanical relay for transmitting in the form of regulating impulses to a regulating gear moving forces of an element, due to its response to the variation of a variable condition, in combination two operating bars vertically guided at their ends and adapted to move toward and away from each other, the sides of said bars facing each other converging towards each other, means for moving one of said bars toward the other periodically in full strokes of uniform length, an impulse transmitting contrivance connecting said other bar with the gear to be regulated, and a spacing pin interposed in the converging space between said bars for transmitting the impulse strokes of the first bar to the second bar, said pin being movable by said responsive element over the length of said space for determining the length of the portion of each full stroke to be transmitted to said second bar, and means for arresting said second bar at the end of each impulse stroke transmitted to it by said pin, and for releasing it during the succeeding impulse stroke of said first bar, to cause the transmission to said gear as an effective impulse stroke only the difference between the adjusted stroke lengths of two succeeding strokes produced when the position of said spacing pin is varied through said responsive element, said gear having means tending to force said second bar against the first bar and a compression spring interposed between said two bars.

4. In a mechanical relay for transmitting in the form of regulating impulses to a regulating gear moving forces of an element, due to its response to the variation of a variable condition, in combination an intermediate impulse transmitter comprising a periodically and independently operating impulse producing element performing strokes of uniform length, an impulse transmitting element yieldingly coupled therewith and adapted to follow the strokes of said producing element, a primary control element actuated by said responsive element for varying the lengths of the paths traversed by said transmitting element in accordance with the action of said responsive element, a main impulse transmitter having a periodically operating main impulse producing element actuated in timed relation with the intermediate impulse producing element and adapted to perform full strokes of uniform length, a main impulse transmitting element for transmitting any desired portion of the length of each of said main strokes to said gear as control impulses, and a main control element interposed between said main impulse producing and impulse transmitting element and movable by said intermediate impulse transmitting element for determining according to its position the length of the portion of each main impulse stroke to be transmitted.

5. In a mechanical relay for transmitting in the form of regulating impulses to a regulating gear moving forces of an element, due to its response to the variation of a variable condition in combination an intermediate impulse transmitter comprising a periodically and independently operating impulse producing element performing strokes of uniform length, an impulse transmitting element yieldingly coupled therewith and adapted to follow the strokes of said producing element, a primary control element actuated by said responsive element for varying the lengths of the paths traversed by said transmitting element in accordance with the action of said responsive element, a main impulse transmitter having a periodically operating main impulse producing element actuated in timed relation with the intermediate impulse producing element and adapted to perform full strokes of uniform length, a main impulse transmitting element for transmitting any desired portion of the length of each of said main strokes to said gear as control impulses, and a main control element interposed between said main impulse producing and impulse transmitting element and actuated by said intermediate impulse transmitting element for determining according to its position the length of the portion of each main impulse stroke to be transmitted, and a variable connection between said intermediate impulse transmitting element and said main control element.

6. In a mechanical relay for transmitting in the form of regulating impulses to a regulating gear moving forces of an element, due to its response to the variation of a variable condition in combination, an intermediate impulse transmitter comprising a periodically and independently operating impulse producing element performing strokes of uniform length, an impulse transmitting element yieldingly coupled therewith and adapted to follow the strokes of said producing element, a primary control element actuated by said responsive element for varying the lengths of the paths traversed by said transmitting element in accordance with the action of said responsive element, a main impulse transmitter having a periodically operating main impulse producing element actuated in timed relation with the intermediate impulse producing element and adapted to perform full strokes of uniform length, a main impulse transmitting element for transmitting any desired portion of the length of each of said main strokes to said gear as control impulses, and a main control element interposed between said main impulse producing and impulse transmitting element and movable by said intermediate impulse transmitting element for determining according to its position the length of the portion of each main impulse stroke to be transmitted, and a variable connection between said intermediate impulse transmitting element and said main control element, and means for arresting said main impulse transmitting element at the end of each main impulse stroke and for releasing it during the succeeding stroke of the main impulse producing element, to cause the transmission to said gear as an effective control impulse stroke only the difference between the adjusted stroke lengths of two succeeding main strokes produced by the movement of main control element through said intermediate impulse transmitting element.

In testimony whereof I affix my signature.

MARTIN EULE.